US006944631B2

(12) United States Patent
Peter

(10) Patent No.: US 6,944,631 B2
(45) Date of Patent: Sep. 13, 2005

(54) METHOD AND SYSTEM FOR NETWORK CONFIGURATION DISCOVERY

(75) Inventor: Gunther Peter, Cadolzburg (DE)

(73) Assignee: Siemens Aktiengesellschaft, Munich (DE)

( * ) Notice: Subject to any disclaimer, the term of this patent is extended or adjusted under 35 U.S.C. 154(b) by 347 days.

(21) Appl. No.: 10/013,616

(22) Filed: Nov. 13, 2001

(65) Prior Publication Data

US 2003/0093426 A1 May 15, 2003

(51) Int. Cl.[7] .......................................... G06F 17/30

(52) U.S. Cl. .................... 707/104.1; 709/219; 709/224; 709/225; 719/313; 719/317

(58) Field of Search ........................... 707/104.1, 3, 10, 707/102; 709/219, 224, 225, 202, 220, 223, 221; 719/313, 317

(56) References Cited

U.S. PATENT DOCUMENTS

| | | | | | |
|---|---|---|---|---|---|
| 5,822,569 | A | * | 10/1998 | McPartlan et al. | 703/21 |
| 5,987,513 | A | * | 11/1999 | Prithviraj et al. | 709/223 |
| 6,094,672 | A | * | 7/2000 | Willie et al. | 709/202 |
| 6,389,464 | B1 | * | 5/2002 | Krishnamurthy et al. | 709/220 |
| 6,532,491 | B1 | * | 3/2003 | Lakis et al. | 709/223 |
| 6,584,503 | B1 | * | 6/2003 | Carney et al. | 709/224 |
| 6,757,901 | B1 | * | 6/2004 | McCloghrie et al. | 719/318 |
| 2002/0091824 | A1 | * | 7/2002 | Anderson et al. | 709/225 |

FOREIGN PATENT DOCUMENTS

| | | | |
|---|---|---|---|
| DE | 694 13 289 | T2 | 10/1994 |
| EP | 0 621 705 | B1 | 9/1998 |
| EP | 0 984 585 | A2 | 3/2000 |
| EP | 1 052 805 | A2 | 11/2000 |
| EP | 1 079 566 | AZ | 2/2001 |

OTHER PUBLICATIONS

Swisher, V. M., et al; "Mastering Network Management", Numidia Press, Fremont, CA (1997), Chapters 1 thru 5.

* cited by examiner

*Primary Examiner*—Uyen Le
*Assistant Examiner*—Hanh Thai
(74) *Attorney, Agent, or Firm*—Schiff Hardin LLP

(57) ABSTRACT

The invention relates to network management, particularly to configuration discovery. The inventive computerized method/system utilize a standard agent-manager network management system having an inventive add-on agent operatively coupled to a database resides on a managed device. The add-on agent is a piece of software and is configured to communicate with the standard agent, and receives a request directed to and forwarded by the standard agent, retrieves stored information from the database operatively coupled to the add-on agent, and passes the retrieved information to the standard agent. The information stored on the database operatively coupled to the add-on agent is associated with an application run on the managed device. Since this information is passed to the standard agent, the standard agent can pass this information to the standard manager. The standard manger is modified to interpret that information and display a representation of the application run on the managed device.

23 Claims, 5 Drawing Sheets

METHOD AND SYSTEM FOR NETWORK CONFIGURATION DISCOVERY

BACKGROUND OF THE INVENTION

1. Field of the Invention

The invention relates to network management, specifically to a method and a system for configuration discovery.

2. Description of the Related Art

The purpose of network management is to manage network performance, discover and solve network problems, and plan for network growth. As defined in V. M. Swisher et al., Mastering Network Management, Numidia Press, Fremont, 1997, network management functions can be divided into fault, configuration, performance, security, and accounting management.

Fault management comprises prophylaxis, detection, and restoration of faulty physical devices of the network. Physical devices of the network are, for example, cables, connectors, switches, bridges, hubs, routers, etc. Configuration management includes planning, extending, and changing the network configuration as well as obtaining information about the current hardware topology of the network. Since the present invention is specifically related to configuration management, configuration management is explained in more detail below. Performance management includes measuring and improving the performance of the network. The purpose of security management is to manage the access to the network itself or to specific resources on the network. Accounting management is, for example, used to attribute usage of at least parts of the network to specific entities within a company's network.

In order to realize network management, a mechanism for management communication (i.e., a network management system) has to be implemented. The network management system comprises a manager and agents. The manager is a piece of software residing on a Network Management Station (NMS). An NMS, sometimes called a console, executes management applications that monitor and control managed devices. Physically, an NMS is usually an engineering workstation with a fast CPU, megapixel color display, substantial memory, and abundant disk space. Managed devices are hardware devices of the network such as computers, routers, and terminal servers that are connected to the network. The manager requests information from the managed devices regarding operational parameters, configuration settings, and other specific information based on the managed device type. In order to respond to a query from the NMS, appropriate software, called an agent, resides on each managed device. Along with the agent, each managed device comprises a database which is operatively coupled with the agent. The database is comprised of information needed for the manager to query and is composed of a list of managed objects. Managed objects are the actual units of management information in the database.

When the manager makes a specific request, the agent of the managed device looks up the management information stored on the database and passes the requested information back to the manager. The contents of the database are specific to the type of managed device being queried.

In order to convey management information between the managed device and the NMS, a particular network management protocol is used. Well known management protocols are, for example, the Simple Network Management Protocol (SNMP) and the Common Management Information Protocol (CMIP). SNMP was developed by the Internet community and was designed to run on Internet Protocol (IP). CMIP was designed by the International Telecommunication Union (ITU). CMIP is an Open System Interconnection (OSI)-style management protocol. If a SNMP-protocol is used, the agent and the manager are often referred to as an SNMP-agent and an SNMP-manager, respectively. The database operatively coupled to the SNMP-agent is also called a management information base (MIB).

Communication between the NMS and the managed devices, i.e., between the manager and the agents, is initiated by the manager. The agent can initiate a communication with the manager only if a catastrophic or near-catastrophic event occurs. This type of communication is called a trap. For example, SNMP defines seven types of traps: Cold boot, warm boot, link down, link up, authentication failure, Exterior Gateway Protocol (EGP) neighbor loss, and enterprise-specific.

A special concern of the invention is configuration management, more specifically configuration discovery. The network's hardware configuration is a map of where the hardware devices of the network are placed in relation to other hardware devices. Hardware devices comprise hubs, routers, computers, bridges, etc. In order to manage the configuration of the network and especially to discover the topology of the network, the manager comprises a configuration discovery application.

The configuration discovery application is a piece of software residing on the NMS. When initiating the discovery application from the NMS, a request is sent from the NMS to the managed devices. Each agent residing on the managed devices receives the request, looks up the requested management information stored in its associated database, and sends a management protocol back to the manager. Each management protocol comprises information about the type of each discovered managed device, so that each discovered managed device and therefore the network topology can be displayed as, for example, an icon specifically assigned to the managed device type on a Graphical User Interface (GUI) of the NMS. The GUI can be, for example, the display of the NMS. The specific managed device type may be a bridge, a switch, a router, or a computer, among others. Therefore, the graphical display of the topology of the discovered network comprises one or more generic icons representing routers, bridges, computers, etc. depending on the discovered managed devices of the network. Sometimes, the database of an agent residing on a computer comprises additional information about the type of operating system of the computer. Then, the displayed icon comprises also information about the operating system of the discovered computer.

Sometimes, however, a representation of a discovered managed device needs to show more detailed information. Such detailed information can be, for instance, a specific application run on that managed device. For example, if a discovered computer controls a machine or an apparatus, perhaps a medical apparatus, then the displayed representation of that computer must comprise information about the type of machine or apparatus controlled by that discovered computer. Then, according to the state of the art, the icon of the represented computer has to be manually replaced by an icon representing the machine or the apparatus controlled by the computer. The replaced icon comprises information about the specific application to be visualized.

FIG. 1 depicts an example of a network comprised of several computers 1 to 10. One of the computers is a NMS 1. On the NMS 1 resides a SNMP-manager which comprises an appropriate configuration discovery application. On each of the remaining computers 2 to 10 resides a SNMP-agent with a MIB operatively coupled to the respective SNMP-agent according to the state of the art. Consequently, the computers 2 to 10 are managed devices, which can be discovered by the SNMP-manager residing on the NMS 1. Furthermore, computer 3 controls a magnetic resonance apparatus 3*a,* computer 4 controls an X-ray apparatus, and computer 7 controls a computed tomography apparatus 7*a.*

The structure of a SNMP-agent 20 and its MIB 21 according to the state of the art is schematically depicted in FIG. 2. Each MIB 21 stores, among other things, information about the operating system of each associated computer 2 to 10. Besides information about the operating system, the MIB 21, however, does not store information about specific applications run on its associated computer 2 to 10. The information about the operating system is coded as a parameter specific to the operating system. In this case, computers 2, 3, 6, 9, and 10 are run by Microsoft Windows NT operating systems, computers 4, 7, and 8 are run by Solaris/SunOS (SUN Unix) operating systems, and computer 5 is run by a Hewlett-Packard Unix operating system. Systems running alternative operating systems could also be included.

When a query to discover the network is initiated by the NMS 1, each SNMP-agent 20 receives this request (step A of the flow chart shown in FIG. 3). Then, each SNMP-agent 20 retrieves the requested information, i.e., the parameter corresponding to the requested information, from its MIB 21 (step B of the flow chart shown in FIG. 3) and sends a SNMP-protocol comprising the retrieved parameter to the SNMP-manager (step C of the flow chart shown in FIG. 3).

Upon receiving the SNMP-protocols, the SNMP-manager displays a representation of the network on a screen 1 a of the NMS 1 (step D of the flow chart shown in FIG. 3). The representation of the discovered network, which is shown in FIG. 4, comprises icons 41 to 49, which represent computers 2 to 10. The icons 41 to 49 are stored on a database 1*b,* which is operatively coupled with the SNMP-manager and resides on the NMS 1. Additionally, each icon 41 to 49 comprises information about the operating system running on the respective computer 2 to 10. Specifically, icons 41, 42, 45, 48, and 49 represent computers which are run by Microsoft Windows NT operating systems, icons 43, 46, and 47 represent computers run by solaris/sunos (SUN Unix) operating systems, and icon 44 represents a computer run by a Hewlett-Packard Unix operating system. Since each SNMP-protocol comprises information associated with the operating system of its respective computer 2 to 10, the SNMP-manager can retrieve the appropriate icon 41 to 49 from database 1*b*. Nevertheless, according to the state of the art, the SNMP-manager cannot receive information regarding a specific application run on computers 2 to 10. Specifically, the SNMP-manager cannot receive information about the type of apparatuses controlled by computers 3, 4, and 7.

SUMMARY OF THE INVENTION

It is, therefore, an objective of the present invention to provide a method and a system which enable a managed device of a discovered network to be displayed in more detail.

The invention provides a computerized method for discovering a managed device which is part of a network, and displaying a representation of an application run on the managed device utilizing a standard manager-agent network management system, comprising the steps of receiving at the managed device from the standard manager residing on a Network Management Station with the standard agent residing on the managed device a request for reporting configuration information of the managed device to the standard manager, forwarding the request from the standard agent to an add-on agent which resides on the managed device, retrieving at least one parameter which is stored on a database associated with the add-on agent and which parameter is associated with the application run on the managed device, passing from the add-on agent the parameter to the standard agent, and sending from the managed device with the standard agent a protocol comprising the parameter to the standard manager residing on the Network Management Station.

The main idea of the present invention is to utilize a standard agent-manager network management system as described in the introduction for network configuration discovery. The standard manager residing on the Network Management Station queries the standard agent residing on the managed device for configuration information and the standard agent sends the queried information using a standard protocol to the manager. A standard agent, however, can only retrieve requested information from its associated database, i.e., the database that is operatively coupled to the standard agent. Such an operatively coupled database is, for example, the MIB of a SNMP-agent. Furthermore, the operative to the agent coupled database comprises only limited information. The information stored is pre-configured by the vendor of the agent and cannot be modified by a user of the agent-manager network management system. Typical configuration information stored on this database is the type of operating system, if the managed device is a computer. Therefore, the standard agent cannot send further configuration information regarding a special application run on the managed device to the standard manager.

According to the invention, the standard agent, when receiving the request for configuration information, forwards the request to the add-on agent instead of retrieving configuration information from its database, which is operatively coupled to the standard agent. The add-on agent is a specially designed software that is configured to communicate with the standard agent. After receiving the forwarded request, the add-on agent retrieves the parameter stored on the database associated with the add-on database and passes the retrieved parameter to the standard agent. The parameter is associated with the special application run on the managed device. After receiving this parameter the standard agent sends it to the standard manager using a standard network management protocol.

Hence, according to a preferred embodiment of the invention, the standard manager residing on the Network Management Station displays, after receiving the protocol sent by the standard agent and based on the parameter sent with the protocol, a representation of the application run on the managed device on a display of the Network Management Station.

One advantage of the invention is that the standard agent-manager network management system is used. Consequently, well designed, tested, and established network management tools can be used for network configuration discovery. As a result, a network management system already implemented and in service does not have to be replaced by a new network management system. It is only necessary to configure the add-on agent including its associated database on the managed device and to slightly modify the standard manger including its database. The database which is operatively coupled with the manager is extended by adding icons. These icons represent those specific applications which run on managed devices which store add-on agents including their associated databases. The manager is modified so that it can interpret a protocol which is associated with a specific application in order to retrieve the appropriate icon from its database. This configuration can be accomplished within a relatively short time.

Another advantage of the invention is that instead of displaying a generic representation of the type of managed device, the representation of the application run on the managed device is displayed on the Network Management Station. Consequently, the content of the displayed configuration information of the managed device is greater than the content of information displayed using the standard agent-manager network management system only, i.e., the agent-manager network management system without the add-on agent. Thus, a representation of a topology of a discovered network using the add-on agent according to the invention is more detailed than the representation of the discovered network using the standard agent-manager network management system only.

According to a further embodiment of the invention, the representation of the discovered managed device is represented as an icon associated with the application run on said managed device.

Particularly in the U.S.A., the Simple Network Management Protocol (SNMP) is widely used. A preferred embodiment of the invention, therefore, is based on the Simple Network Management Protocol. Thus, the standard agent is a SNMP-agent, the standard manager is a SNMP-manager and the protocol sent from the SNMP-agent to the SNMP-manager is a Simple Network Management Protocol.

Another well known protocol used for network management systems is the Common Management Information Protocol (CMIP). Consequently, according to a further variant of the invention, the standard agent is a CMIP-agent, the standard manager is a CMIP-manager and the protocol sent from the CMIP-agent to the CMIP-manager is a Common Management Information Protocol.

In many applications, a computer controls an apparatus. If that computer is a managed device, then it is often required to represent, on the display of the Network Management Station, not a computer or its operating system, but the apparatus controlled by that computer. The managed device can be, according to a further embodiment of the invention, a computer controlling an apparatus; the application run on that computer may be associated with that apparatus controlled by the computer. According to further embodiments of the invention, the apparatus may be a medical apparatus and especially a computed tomography apparatus, a magnetic resonance apparatus, an ultrasound apparatus, or an X-ray apparatus.

The invention also provides a system comprising a piece of computer software called an add-on agent residing on a managed device of a network and a database which is associated with the add-on agent and stores a parameter associated with an application run on the managed device in which the add-on agent is configured to retrieve the parameter from the database and to forward the parameter to an agent residing on the managed device, when the agent receives a request for reporting configuration information of the managed device from a manager residing on a Network Management Station. The add-on agent residing on the managed device is configured to be able to communicate with the agent. The agent is a standard agent as described in the introduction and receives the request from the manager which is also a standard manager residing on the Network Management Station. Instead of retrieving information stored on a database operatively coupled with the agent, the agent forwards the request for configuration information requested from the manager to the add-on agent. Upon receiving the forwarded request from the agent, the add-on agent is configured to retrieve the parameter stored on its associated database and pass the retrieved parameter to the agent. The agent can then, according to an embodiment of the invention, send this parameter with an appropriate protocol to the manager. Since the parameter is associated with the application run on the managed device, the manager obtains information about this application.

One advantage of the inventive system is, similar to the inventive computerized method, that a standard agent residing on the managed device is utilized. Therefore, an already installed and established network management system does not have to be replaced when additional information from a specific application run on the managed device is needed for configuration information. Furthermore, the inventive add-on agent can be configured in a relatively short time. The inventive system is further designed to be used to carry out the inventive computerized method. Advantageous refinements of the invention are described further below.

BRIEF DESCRIPTION OF THE DRAWINGS

Other advantages, features and details of the invention can be found in the illustrative embodiment of the invention which is described below with reference to the drawings, in which.

DESCRIPTION OF THE PREFERRED EMBODIMENTS

FIGS. 1 to 4 described above illustrate the present state of the art. However, the SNMP-agent 20 according to the state of the art cannot retrieve information about specific applications run on computers 2 to 10 other than information about the operating system. Particularly, the SNMP-agent 20 cannot retrieve information about the specific medical apparatuses 3*a,* 4*a,* and 7*a* controlled by computers 3, 4, and 7.

Figure 1:
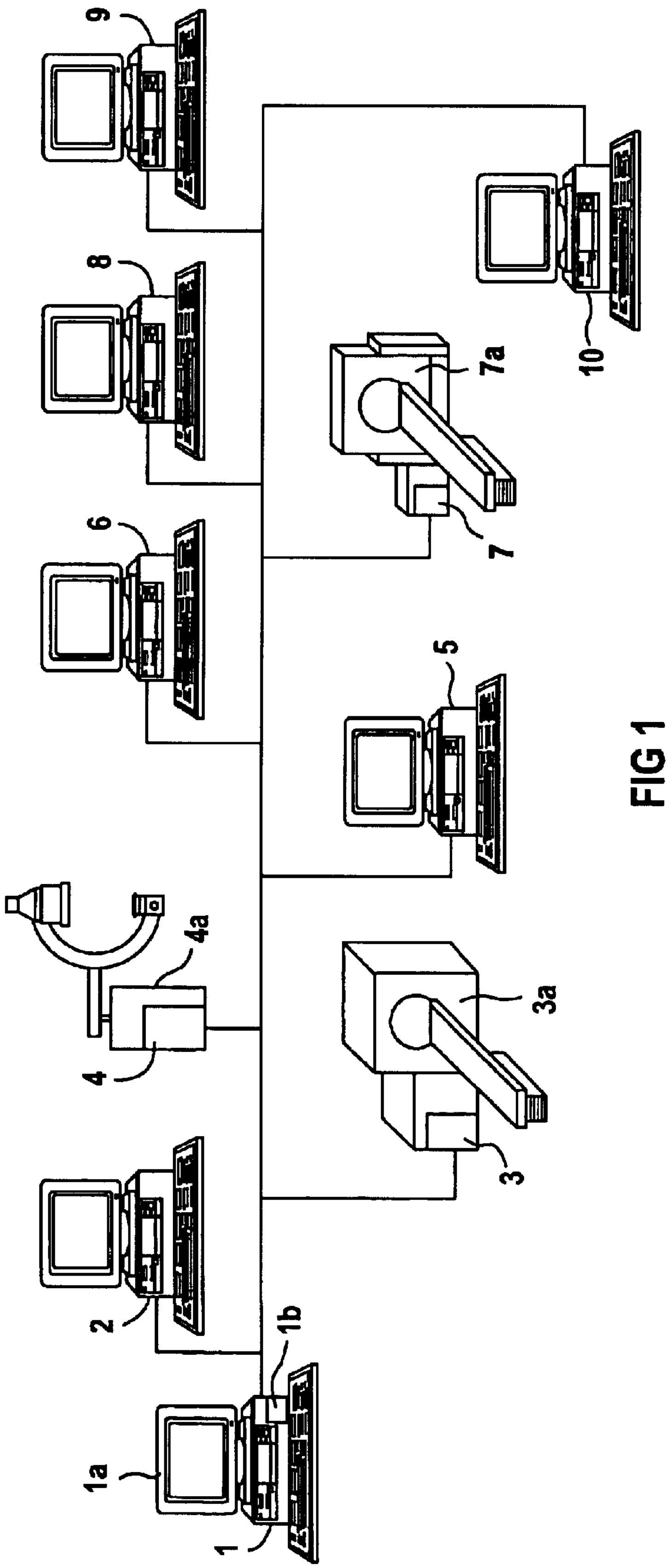
FIG. 1 is a pictoral network diagram illustrating a network management station and managed devices in a network according to the state of the art.
Figure 2:
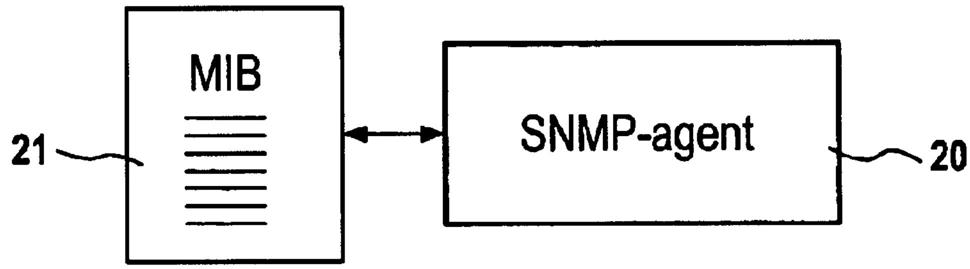
FIG. 2 is a block diagram showing a known structure of a SNMP-agent with its associated MIB.
Figure 5:
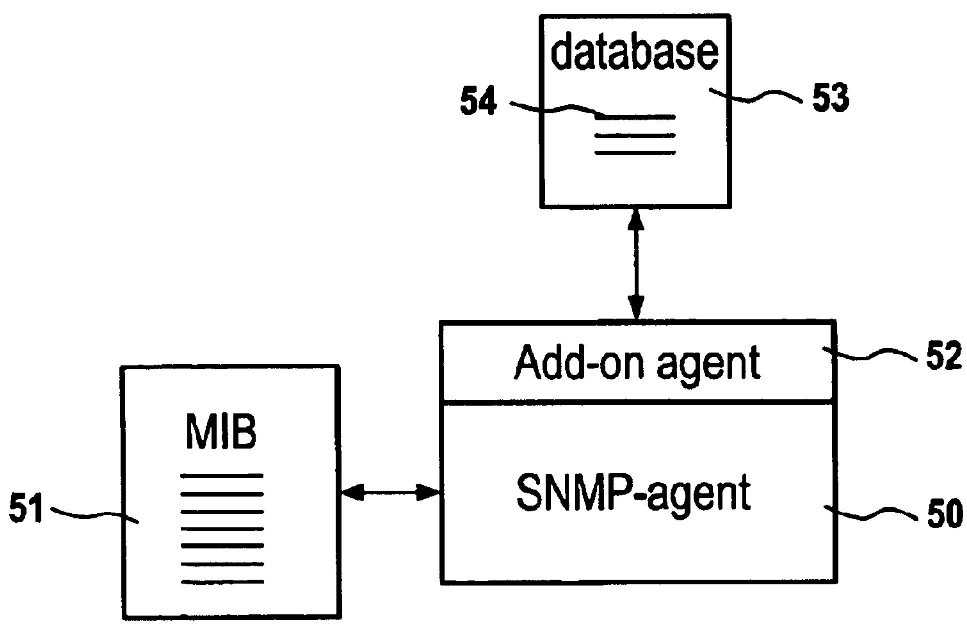
FIG. 5 is a block diagram showing the structure of the inventive system, which communicates with a standard agent.
Figure 3:
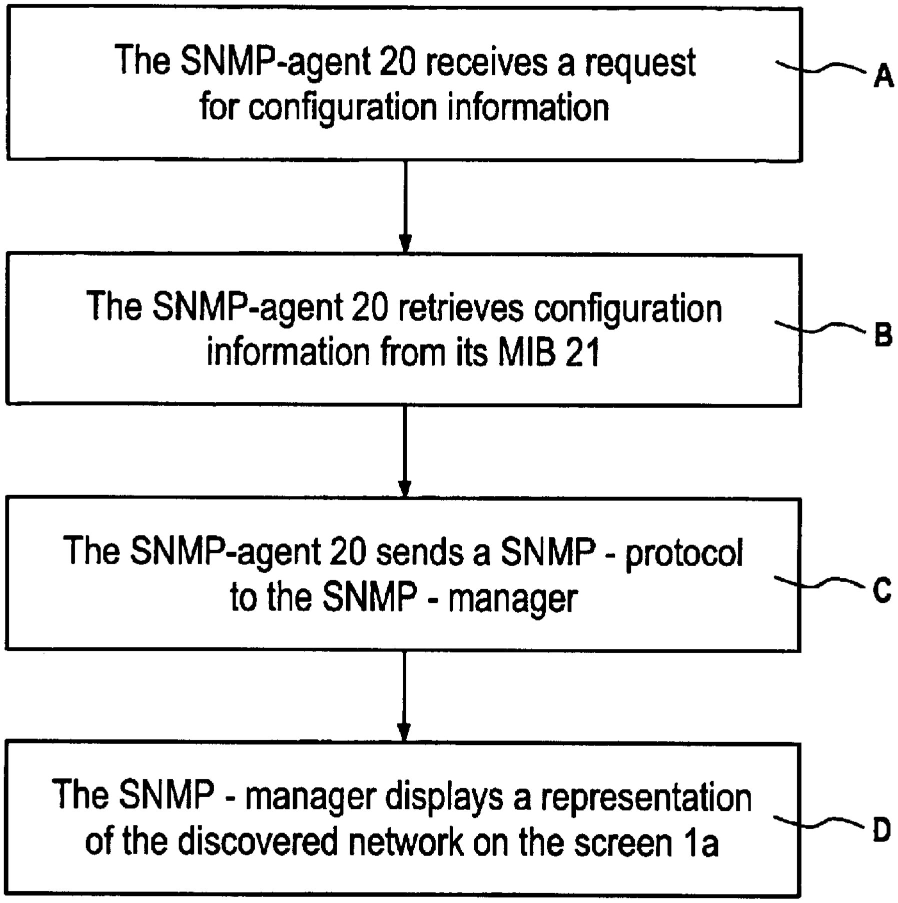
FIG. 3 is a flow chart illustrating network discovery according to the state of the art.
Figure 4:
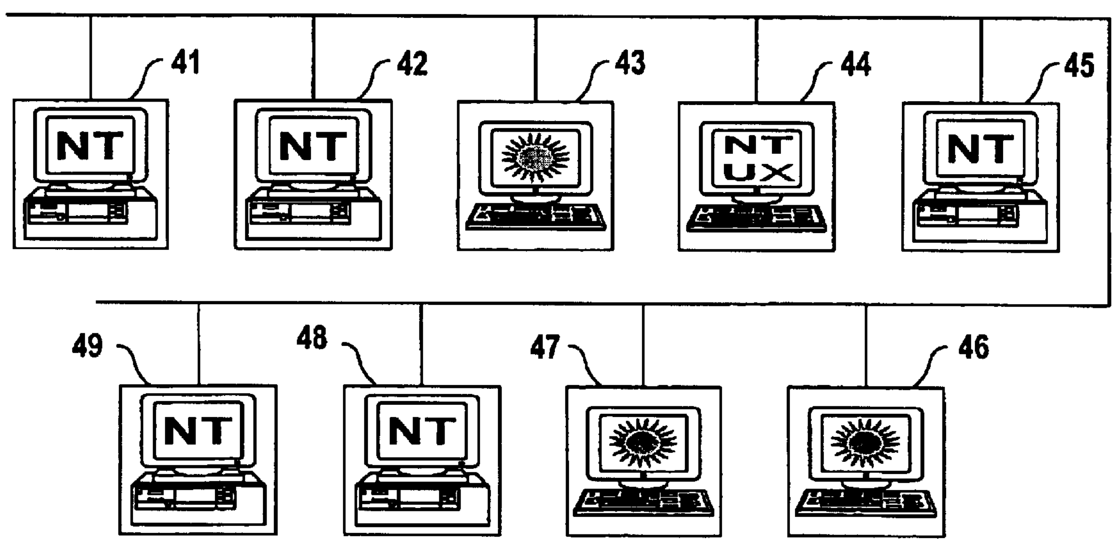
FIG. 4 is a pictoral diagram showing a computer display representation of the network shown in FIG. 1 according to the state of the art.

In order to automatically discover the type of medical (or other) apparatus controlled by computers 3, 4, and 7, an inventive system, as shown in FIG. 5, is configured on each of the computers 3, 4, and 7. A standard SNMP-agent 20, as shown in FIG. 2, resides on each of the computers 2, 5, 6, and 8 to 10.

The inventive system is comprised of computer software called an add-on agent 52 and a database 53. The database 53 is operatively coupled with the add-on agent 52 and comprises at least one parameter 54. The parameter 54 is associated with the medical apparatus which is controlled by the respective computer on which the inventive system resides. Consequently, if the add-on agent 52 and its associated database 53 reside on computer 3, then the parameter 54 is associated with a magnetic resonance apparatus; if the add-on agent 52 and its associated database 53 reside on computer 4, then the parameter 54 is associated with an X-ray apparatus; and if the add-on agent 52 and its associated database 53 reside on computer 7, then the parameter 54 is associated with a computed tomography apparatus.

Along with the add-on agent 52, a standard SNMP-agent 50 resides on each of the computers 2, 3, and 7. The SNMP-agent 50 is operatively coupled with an MIB 51. The MIB 51 contains a list of managed objects according to the state of the art. Furthermore, the add-on agent 52 is configured to communicate with the standard SNMP-agent 50. When the SNMP-agent 50 receives a request for configuration information from the SNMP-manager residing on the NMS 1 (step I of the flow chart shown in FIG. 6), then the SNMP-agent 50 forwards this request to the add-on agent 52 (step II of the flow chart shown in FIG. 6), instead of retrieving configuration information from its MIB 51.

Figure 6:
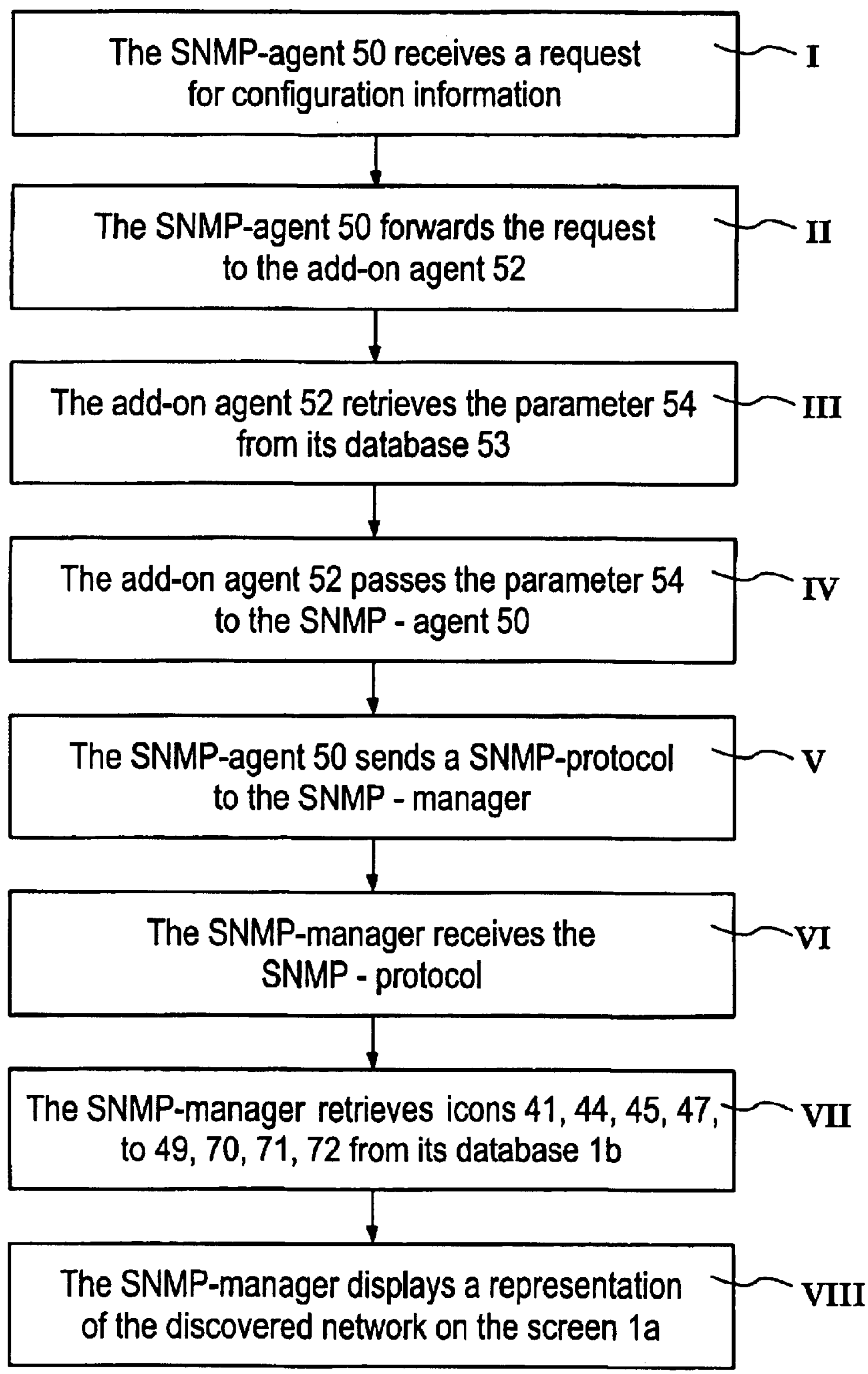
FIG. 6 is a flow chart illustrating the inventive computerized method.

Upon receiving the forwarded request, the add-on agent 52 retrieves the parameter 54 from its database 53 (step III of the flow chart shown in FIG. 6) and passes it to the SNMP-agent 50 (step IV of the flow chart shown in FIG. 6).

After that, the SNMP-agent 50 sends a SNMP-protocol comprising the parameter 54 to the SNMP-manager residing on the NMS 1 (step V of the flow chart shown in FIG. 6).

The NMS 1 comprises a database 1*b* that is operatively coupled with the SNMP-manager. The database 1*b* comprises, when initially delivered by the vendor, only a list of generic icons which represent, among other things, generic computers, routers, bridges, computers comprising information about their operating systems, etc. So that the SNMP-manager can also display icons representing specific applications run on specific managed devices, these icons must be added to the database 1*b* that is operatively coupled with the SNMP-manager. Consequently, the database 1*b* comprises (in addition to the icons initially stored), for example, an icon representing a magnetic resonance apparatus, an icon representing an X-ray apparatus, and an icon representing a computed tomography apparatus. Other application-based icons can readily be envisioned by one of skill in the art, which can include software-based and hardware-based applications. Moreover, the SNMP-manager is slightly modified so that it can interpret the parameters 54 of the SNMP-protocols received from the SNMP-agents 50 of the computers 3, 4, and 7 in order to retrieve the respective icons representing, e.g., a magnetic resonance apparatus, an X-ray apparatus, and a computed tomography apparatus from its database 1*b*.

Since the SNMP-manager receives an SNMP-protocol from each of the discovered computers 2 to 10, the SNMP-manager receives information about which operating systems reside on computers 2, 5, 6, and 8 to 10, and what type of medical apparatus is controlled by computers 3, 4, and 7 (step VI of the flow chart shown in FIG. 6). With this information, the SNMP-manager retrieves the appropriate icons from its database 1*b* (step VII of the flow chart shown in FIG. 6) and displays a representation of the discovered network on screen 1*a* of the NMS 1 (step VIII of the flow chart shown in FIG. 6).

Figure 7:
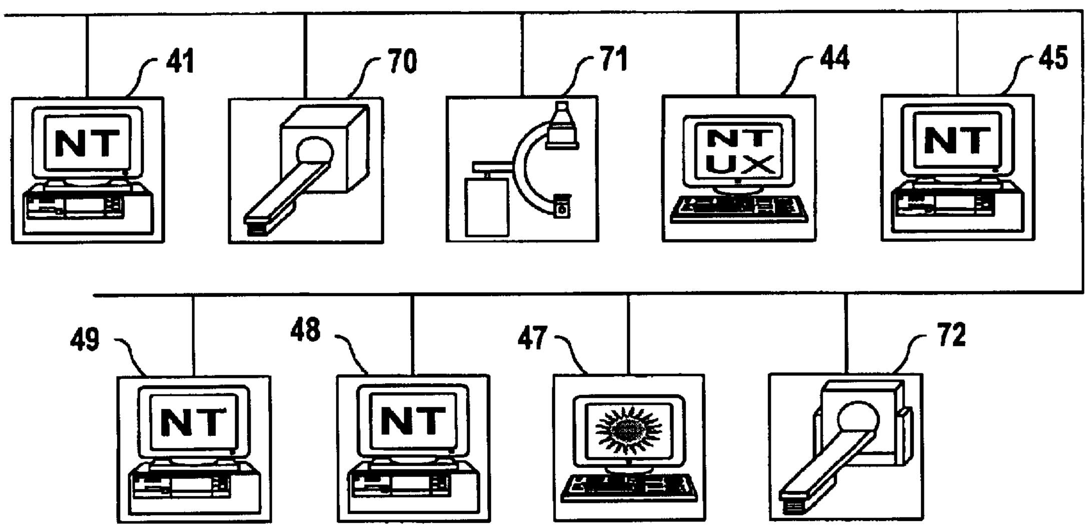
FIG. 7 is a pictoral diagram showing a computer display representation of the discovered network according to the invention.

The representation of the discovered network according to the invention is shown in FIG. 7. Since a standard SNMP-agent, as depicted in FIG. 2, resides on each of the computers 2, 5, 6, and 8 to 10, each computer 2, 5, 6, and 8 to 10 is represented by the respective icons 41, 44, 45, and 47 to 49. Since an inventive system, as depicted in FIG. 5, resides on each of the computers 3, 4, and 7, computer 3 is represented by an icon 70 showing a magnetic resonance apparatus, computer 4 is represented by an icon 71 showing an X-ray apparatus, and computer 7 is represented by an icon 72 showing a computed tomography apparatus.

An SNMP-manger, SNMP-agents 20 and 50, and SNMP-protocols are used In the exemplary embodiment described. Nevertheless, the inventive system and the inventive computerized method do not depend on the SNMP standard. A Common Management Information Protocol (CMIP), a CMIP-agent and a CMIP-manager can be utilized as well as other network management systems based on the agent-manager model.

Furthermore, apparatuses controlled by computers are not restricted to the magnetic resonance apparatus 3*a*, the X-ray apparatus 4*a*, and the computed tomography apparatus 7*a* described in the exemplary embodiment. A controlled apparatus does not need to be a medical apparatus. Other applications run on computers which are managed devices and comprise the inventive system can also be displayed.

The above-described method and system are illustrative of the principles of the present invention. Numerous modifications and adaptations will be readily apparent to those skilled in this art without departing from the spirit and scope of the present invention.

What is claimed is:

1. A computerized method for discovering a managed device which is part of a network, and displaying a representation of an application run on said managed device utilizing a standard manager-agent network management system, comprising:

receiving, at said managed device from a standard manager residing on a Network Management Station with a standard agent associated with a standard database residing on said managed device, a request for reporting configuration information of said managed device to said standard manager;

forwarding said request from said standard agent to an add-on agent associated with an add-on database which resides on said managed device;

retrieving at least one parameter which is stored on said add-on a database associated with said add-on agent and which parameter is associated with said application run on said managed device;

passing from said add-on agent said parameter to said standard agent; and sending from said managed device with said standard agent a protocol comprising said parameter to said standard manager residing on said Network Management station.

2. The computerized method of claim 1, further comprising:

receiving said protocol at said Network Management Station with said standard manager and displaying said representation of said application run on said managed device based on said received parameter on a display of said Network Management Station.

3. The computerized method of claim 2, wherein said representation is an icon associated with said application run on said managed device.

4. The computerized method of claim 1, wherein said protocol is a Simple Network Management Protocol (SNMP), said standard agent is an SNMP-agent, and said standard manager is an SNMP-manager.

5. The computerized method of claim 1, wherein said protocol is a Common Management Information Protocol (CMIP), said standard agent is a CMIP-agent, and said standard manager is a CMIP-manager.

6. The computerized method of claim 1, wherein said managed device is a computer which controls an apparatus and said application is associated with said apparatus.

7. The computerized method of claim 6, wherein said apparatus is a medical apparatus.

8. The computerized method of claim 7, wherein said medical apparatus is a computed tomography apparatus, a magnetic resonance apparatus, an ultrasound apparatus or an X-ray apparatus.

9. A networked system comprising:

a managing device connected to said networked system that is a Network Management Station comprising a standard manager;

a managed device connected to said networked system comprising a standard agent associated with a standard database;

an add-on agent that is a software module residing on said managed device;

an add-on database which is associated with said add-on agent that comprises a parameter associated with an application run on said managed device;

said add-on agent being configured to retrieve said parameter from said add-on database and to forward said parameter to said standard agent when said standard agent receives a request for reporting configuration information of said managed device from said standard manager.

10. The system of claim 9, wherein said agent sends a protocol comprising said parameter to said Network Management Station.

11. The system of claim 10, wherein said protocol is a Simple Network Management Protocol (SNMP), said standard agent is an SNMP-agent, and said standard manager is an SNMP-manager.

12. The system of claim 10, wherein said protocol is a Common Management Information Protocol (CMIP), said standard agent is a CMIP-agent, and said standard manager is a CMIP-manager.

13. The system of claim 9, wherein said managed device is a computer which controls an apparatus, and said application is associated with said apparatus.

14. The system of claim 13, wherein said apparatus is a medical apparatus.

15. The system of claim 14, wherein said medical apparatus is a computed tomography apparatus, a magnetic resonance apparatus, an ultrasound apparatus or an X-ray apparatus.

16. A networked system comprising:

a managed device connected to said networked system comprising a standard agent associated with a standard database;

an add-on agent that is a software module residing on said managed device;

a first add-on database which is operatively coupled with said add-on agent;

said system being configured to:

store on said first add-on database information of an application run on said managed device;

retrieve from said first add-on database said information with said add-on agent; and communicate with said add-on agent with said standard agent so that said retrieved information is passed from said add-on agent to said standard agent when said standard agent receives a query to obtain configuration information about said managed device.

17. The system of claim 16, further comprising:

a central computer which is a managing device connected to said network and comprises a stored manager;

wherein said information is passed through said network to said manager, said central computer being configured to initiate said query.

18. The system of claim 17, further comprising:

a second database comprising a graphical representation of said application run on said managed device;

said manager being operatively coupled to said second database.

19. The system of claim 18, further comprising:

a display connected to said central computer;

said manager being configured to retrieve said graphical representation upon receiving said information from said agent in order to display said graphical representation on said display.

20. The system of claim 16, wherein said information is passed through said network utilizing a Simple Network Management Protocol (SNMP).

21. The system of claim 16, wherein said information is passed through said network utilizing a Common Management Information Protocol (CMIP).

22. The system of claim 16, wherein said managed device is a computer controlling an electric device and said application is related to said electric device. 20.

23. The system of claim 22, wherein said electrical device is a medical device.

* * * * *